March 12, 1968  N. I. ASHWORTH  3,372,704
DEGREASING
Filed Aug. 31, 1964
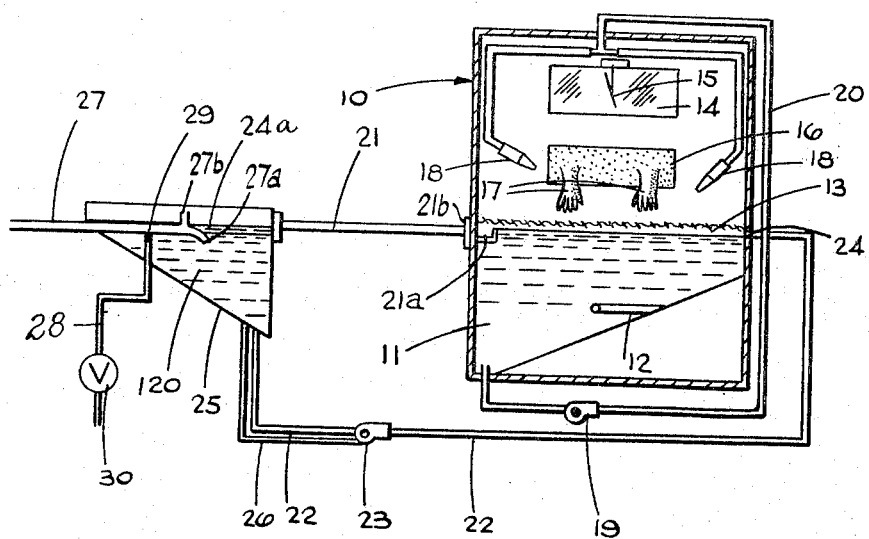
INVENTOR.
NORMAN IVES ASHWORTH
By Kurt Kelman
agent

United States Patent Office 3,372,704
Patented Mar. 12, 1968

3,372,704
DEGREASING
Norman Ives Ashworth, St. Martins, Guernsey, Channel Islands, assignor to Abrasive Developments Limited, Solihull, England, a British company
Filed Aug. 31, 1964, Ser. No. 393,031
Claims priority, application Great Britain, Sept. 14, 1963, 36,280/63
1 Claim. (Cl. 134—109)

ABSTRACT OF THE DISCLOSURE

A degreasing apparatus having a tank containing the degreasing liquid and nozzles arranged above the tank to direct the liquid on the contaminated object and return same to the tank. Means for skimming liquid and grease from the surface of the liquid in the tank, separating grease from the withdrawn liquid and returning the clarified liquid to the tank.

BACKGROUND OF THE INVENTION

Field of the invention

The invention has been developed in connection with degreasing apparatus wherein an article to be degreased is subjected to a spray of a hot degreasing liquid. The invention is also applicable to processes in which the article to be degreased is subjected to a stream of degreasing liquid plus abrasive or other solid particles. Hereinafter the term "grease" is used to include all contaminants which rise to the surface of the degreasing liquid and the term "degreasing" is used in a similarly broad sense to denote the partial or entire removal from the liquid of the oil, grease or contaminants.

Description of prior art

In a known type of such apparatus there is provided a casing, the lower part of which forms a tank for a degreasing liquid, the tank containing heaters to heat the liquid. At the top of the tank is a wire mesh upon which the article to be degreased is placed and nozzles are provided in the top of the casing to play upon the article on the mesh. The front part of the casing is provided with a window through which an operator can follow the process, the inside of the window being cleaned by a conventional windscreen wiper which is supplied with clean water from jets adjacent to the window. Below the window there is a cut-out in the casing having a pair of rubber gloves formed in an apron so that the operator can put his hands into the gloves and manipulate the nozzles and the article to be degreased within the casing.

In such apparatus, the degreasing liquid normally used is withdrawn from the bottom of the tank by a pump and is re-circulated to the nozzles so that the liquid, and the grease which has been removed from the article, fall through the wire mesh back into the tank. It will be appreciated that, if no filter or other provision is made to remove the grease, the article would soon be subjected to a stream of greasy liquid which would not have the desired degreasing effect. It has therefore been the practice in such a machine to provide a filter for the degreasing liquid. Various types of filter have been used but without a great deal of success. The pores in the filter tend to clog up and the filters are not efficient. In one example, a filter capable of passing 30 gallons a minute would probably last for a single day. Moreover, the machine would have to be drained every three or four hours and refilled with fresh solution. While the cost in terms of material of refilling the machine is not great, the inconvenience of having to refill the machine twice a day and the time wasted are undesirable since they prevent full and therefore economic use of the machine.

Summary of the invention

According to a first aspect of the invention I provide degreasing apparatus comprising a main tank, a separating tank, first and second conduits between the tanks, the first conduit being located to receive the surface layer of the liquid in the main tank when the liquid therein is at its normal working level and to deliver the liquid in such surface layer to the separating tank, a pump in the second conduit which is located to draw liquid from the separating tank at a level below that at which liquid is delivered thereto by the first conduit and to deliver the liquid so drawn to the main tank at a level in a zone extending downwardly from said normal working level, nozzle means arranged above said main tank to direct liquid at articles to be degreased and located so that the liquid draining from said article drains back into the main tank, a further pump, and third conduit means associated with said further pump and the nozzle means to draw liquid from adjacent the bottom of the main tank and to deliver such liquid to the nozzle means.

Due to the provision of two pumps and two liquid circuits, the degreasing liquid is degreased continuously by being passed through the separating tank irrespective of liquid drawn from the main tank for degreasing the articles.

According to another aspect of the invention I provide the method of degreasing an article with a liquid to the surface of which grease rises, comprising drawing liquid from a main body of the liquid below a surface layer thereof, directing said liquid at the article to be degreased, causing the liquid draining from said article to rejoin said main body, continuously allowing said surface layer to flow into a separating tank, drawing degreased liquid continuously from the separating tank at a level lower than that at which the liquid flows into the tank and delivering the degreased liquid to the main body of the liquid at a level in a zone extending downwardly from the top of said surface layer, the flow of liquid through the separating tank being such as to allow the grease to rise to, and remain on, the surface of the liquid in the separating tank.

Brief description of the drawing

The invention will now be described by way of example with reference to the accompanying diagrammatic drawing which shows apparatus for abrading and degreasing articles.

Description of the preferred embodiment

The apparatus comprises a casing 10 the bottom part of which is formed as a main tank 11 for a degreasing liquid containing an abrasive. Immersion heaters 12 are mounted in the tank to heat the liquid to the desired temperature. The tank is covered by a wire mesh 13 upon which the article to be degreased and abraded is placed. The upper part of the casing above the tank is formed with a window 14, the inner surface of which is kept clear by a windscreen wiper 15 which is supplied with clean water from jets (not shown) at the sides of the window. Between the window and the top of the tank there is an opening 16 in the front of the casing in which is mounted a rubber apron having two rubber gloves 17 moulded therein. Mounted in the casing above the mesh are nozzles 18 for the discharge of liquid and abrasive onto the article to be treated. An operator standing by the casing can place his hands in the gloves 17 and manipulate the nozzles 18 and/or the article to be cleaned while watching the operation through the window 14.

The main liquid circuit of the apparatus comprises a main pump 19 which draws liquid and abrasive from the bottom of the main tank and circulates it along a conduit 20 to the nozzles 18 at high pressure. It will be appreciated that as articles are treated in the apparatus the grease removed from the articles will flow with the hot degreasing liquid into the main tank 11 so that the liquid therein will become greasy. The grease will tend to rise to the top of the tank but would tend to be sucked back into circuit by the pump 19 if it were not removed with the result that the article would be treated with greasy liquid.

The grease is removed from the liquid in the main tank 11 by the following apparatus. A comparatively small separation tank 120 is mounted outside the casing and is joined to the main tank by first and second conduits 21 and 22. The liquid level in the separating tank 120 is arranged to be substantially 2" below the liquid level in the main tank 11 this difference in level being attained by the provision of a weir 21a over which the surface layer of liquid in the main tank flows into the inlet 21b of the first conduit. The weir prevents reverse flow of grease from the separating tank to the main tank when the machine is inoperative. The first conduit 21 delivers the surface layer of the liquid in the main tank to the separating tank at a level substantially co-incident with the normal working level of the liquid therein.

The second conduit 22 connects the bottom of the separating tank 120 with the inlet to a pump 23 and the second conduit then extends from the outlet of the pump 22 to an outlet 24 within the main tank 11 of the machine at the normal working level of the liquid therein. The outlet 24 is directed towards the inlet 21b to the first conduit 21 so as to assist the flow of liquid through the conduit 21 from the main tank 11 to the separating tank 20.

The operation of the system so far described is as follows:

Liquid flows over the weir 21a from a surface layer of the liquid in the main tank 11 into the separating tank 120 through the first conduit 21 and liquid is continuously drawn from the bottom of the separating tank 120 by the pump 23 and returned to the liquid in the main tank at the surface thereof and in a manner such as to avoid causing turbulence in the surface layer which flows into the separating tank. The flow above described is continuous during normal working hours whether or not the main liquid circuit including the conduit 20, which may be considered to be a third conduit, and the pump 19 is in operation. The liquid flow through the conduit 21 and through the separating tank 120 is arranged to be substantially without turbulence, so that the grease is allowed to rise to the top of the liquid in the separating tank and to remain there in a layer 24a without being disturbed.

Thus in operation the most greasy portion of the liquid in the main tank will rise to the surface of that liquid and will flow into the separating tank where it will encounter quiet conditions. The grease will remain at the top of the tank and the liquid and abrasive will sink down and will be drawn out of the tank through the second conduit 22 by the pump 23 and will be returned to the main tank. Since the process is continuous, there will be continuous removal of grease from the liquid in the main tank and this grease will build up in the separating tank on the surface of the liquid therein. While it is obvious that for any charge of liquid in the separating tank at any instant not all the grease will rise to the top, the fact that the process is continuous means that in due course the major part of the grease in the liquid in the main tank will be removed from the liquid and join the layer of grease at the top of the separating tank.

The apparatus also contains several other features. The separating tank is provided with a sloping bottom 25 so that the abrasive falls to the bottom of the separating tank and the second conduit is connected to the separating tank at the bottom thereof so as to withdraw a mixture of liquid and abrasive. Moreover, the pump 23 is preferably of the type described in the British patent specification No. 840,671 of Abrasive Developments Limited. In this construction of pump, some of the mixture of liquid and abrasive being pumped is used to seal the running joint between the impeller and the pump casing and is then discharged from the pump. The sealing liquid and abrasive discharged from the pump is returned to the separating tank through a pipe 26.

The liquid in the main tank, which will normally be an aqueous solution will decrease by evaporation but will remain topped up by means of the clean water which is supplied to the inside of the window to assist the windscreen wiper in keeping the window clean. It will, however, be necessary to top up the liquid in the main tank with a degreasing chemical say, for example, once a day. The separating tank is provided with an overflow 27 in case the liquid level in the main and separating tanks should rise above a predetermined level. The overflow has its inlet 27a below the level of the liquid in the tank and is provided with an air vent 27b at its highest point which extends above the grease layer 24a. It will be seen that if the liquid level rises above that shown the excess liquid will be removed from the separating tank without disturbing the layer 24a of grease which lies on the surface of the liquid in the separating tank.

Means is provided for removing the layer of grease 24a without the necessity for draining the liquid in the separating tank. This means comprises a pipe 28 which passes through the base 25 of the separating tank and whose upper end 29 lies about ¾" below the working level of the liquid in the separating tank. A tap 30 is provided on the pipe outside the tank. When the grease layer is to be removed, the tap is opened and the grease passes down the pipe and out of the tank. When all the grease and a layer of liquid ¾" deep have been discharged no further liquid can follow because of the position of the open end of the pipe.

It will be seen that the invention provides a method and apparatus for degreasing articles and which requires no replaceable elements such as filters. Moreover, the disadvantage possessed by filters of clogging up is also avoided in the apparatus embodying the invention. It has been found in practice that the continuous circulation of the liquid through the separating tank does produce an acceptable degree of degreasing, so that the liquid remains active and need only be topped up with degreasing chemical when required. If there were no supply of water such as from the water jets at the window of the apparatus described, or if the liquid in the tank was other than aqueous, it would also be necessary to top up the liquid to maintain the working level to replace liquid lost by evaporation.

Although the invention has been specifically described with reference to the use of abrasive, other solid particles may also be used. Moreover the liquid delivered at 24 to the main tank could be at a level below the level of the liquid in the main tank.

What I claim then is:
1. Degreasing apparatus comprising:
 (a) a main tank;
 (b) a separating tank for separating grease from an aqueous liquid;
 (c) weir means in said main tank for maintaining a normal working level of liquid in said tank while liquid is being supplied to the same;
 (d) first and second conduits connecting said tanks,
  (1) said first conduit having an inlet communicating with and downstream of said weir means and an outlet in said separating tank,
  (2) said second conduit having an inlet in said separating tank substantially lower than said outlet of the first conduit, and an outlet in said main tank substantially at said level and directed toward said weir means so that it causes grease at the surface of said aqueous liquid to move toward said weir means;

(e) a first pump arranged in the second conduit for pumping liquid from said separating tank into said main tank;

(f) nozzle means above said main tank for directing a stream of said aqueous liquid against an object to be degreased while the object is being held above said level, whereby the liquid of said stream is drained into said main tank;

(g) a third conduit having an inlet in said main tank substantially lower than the inlet of said first conduit and connecting said inlet thereof with said nozzle means;

(h) a second pump in said third conduit; and means including a grease discharge means for maintaining in said separating tank a liquid level lower than the level in said main tank.

References Cited

UNITED STATES PATENTS

| | | | |
|---|---|---|---|
| 1,032,458 | 7/1912 | White | 210—242 X |
| 2,530,054 | 11/1950 | Gordon | 210—195 |
| 2,867,903 | 3/1959 | Lee | 210—242 |
| 3,116,912 | 1/1964 | Finsberg | 210—195 X |
| 3,219,190 | 11/1965 | Thune | 210—242 |
| 3,227,167 | 1/1966 | Parent | 210—167 X |

SAMIH N. ZAHARNA, *Primary Examiner.*